United States Patent
Zhou et al.

(10) Patent No.: US 9,156,733 B2
(45) Date of Patent: Oct. 13, 2015

(54) RARE EARTH IONS DOPED ALKALI METAL SILICATE LUMINESCENT GLASS AND THE PREPARATION METHOD THEREOF

(75) Inventors: Mingjie Zhou, Shenzhen (CN); Yanbo Qiao, Shenzhen (CN); Wenbo Ma, Shenzhen (CN)

(73) Assignee: OCEAN'S KING LIGHTING SCIENCE & TECHNOLOGY CO., LTD., Shenzhen (CN)

( * ) Notice: Subject to any disclaimer, the term of this patent is extended or adjusted under 35 U.S.C. 154(b) by 192 days.

(21) Appl. No.: 13/810,008

(22) PCT Filed: Jul. 14, 2010

(86) PCT No.: PCT/CN2010/075157
§ 371 (c)(1),
(2), (4) Date: Jan. 14, 2013

(87) PCT Pub. No.: WO2012/006779
PCT Pub. Date: Jan. 19, 2012

(65) Prior Publication Data
US 2013/0105734 A1 May 2, 2013

(51) Int. Cl.
*C09K 11/77* (2006.01)
*C03C 3/083* (2006.01)
(Continued)

(52) U.S. Cl.
CPC ............... *C03C 21/005* (2013.01); *C03C 3/06* (2013.01); *C03C 4/12* (2013.01); *C03C 23/0095* (2013.01);
(Continued)

(58) Field of Classification Search
CPC ............... C09K 11/02; C09K 11/7734; C09K 11/7773; C09K 11/7774; C03C 3/004; C03C 3/06; C03C 3/14; C03C 3/15; C03C 3/064; C03C 3/068; C03C 3/076; C03C 3/083; C03C 3/091; C03C 3/095; C03C 3/125; C03C 10/0036; C03C 10/0045; C03C 10/0009; C03C 10/004; C03C 2201/36; C03C 2201/3423; C03C 2201/3458; C03C 10/0027; C03C 11/00; C03C 12/00; C03C 13/046; C03C 4/12; C03C 14/004; C03C 23/0095
USPC ....... 252/301.4 F, 301.4 R; 501/4, 12, 32, 50, 501/53, 54, 65, 66, 72; 65/17.2; 313/502
See application file for complete search history.

(56) References Cited

U.S. PATENT DOCUMENTS

2006/0037366 A1* 2/2006 Chen et al. ...................... 65/399

FOREIGN PATENT DOCUMENTS

| CN | 1405106 | 3/2003 |
|----|---------|--------|
| CN | 1736920 | 2/2006 |

(Continued)

OTHER PUBLICATIONS

Http://www.corning.com/docs/specialtymaterials/pisheets/Vycor%207930.pdf, Corning Brochure for Vycor®, 2001.*
Machine translation of JP2010-006664A, printed Aug. 21, 2014.*
Machine translation of CN101691279, printed Aug. 21, 2014.*

*Primary Examiner* — Matthew E Hoban
*Assistant Examiner* — Lynne Edmondson
(74) *Attorney, Agent, or Firm* — Hamre, Schumann, Mueller & Larson, P.C.

(57) ABSTRACT

A preparation method of rare earth ions doped alkaline earth metal silicate luminescent glass is provided. The steps involve: step 1, mixing the source compounds of cerium, terbium and alkaline earth metals and putting the mixture into solvent to get a mixed solution; step 2, impregnating the nanometer pores glass with the mixed solution obtained in step 1; step 3: calcining the impregnated nanometer pores glass obtained in step 2 in a reducing atmosphere, cooling to room temperature, then obtaining the cerium and terbium co-doped alkaline earth metal silicate luminescent glass. Besides, the rare earth ions doped alkaline earth metal silicate luminescent glass prepared with aforesaid method is also provided. In the prepared luminescent glass, cerium ions can transmit absorbed energy to terbium ions under the excitation of UV light due to the co-doping of cerium ions. As a result, the said luminescent glass has higher luminous intensity than the glass only doped with terbium.

8 Claims, 2 Drawing Sheets

(51) Int. Cl.
  *C03C 4/12*   (2006.01)
  *C03C 21/00*  (2006.01)
  *C03C 3/06*   (2006.01)
  *C03C 23/00*  (2006.01)

(52) U.S. Cl.
  CPC ..... C09K 11/7774 (2013.01); *C03C 2201/3423* (2013.01); *C03C 2201/3458* (2013.01); *C03C 2201/36* (2013.01); *C03C 2203/50* (2013.01)

(56) References Cited

FOREIGN PATENT DOCUMENTS

| | | | |
|---|---|---|---|
| CN | 101215093 | | 7/2008 |
| CN | 101691279 | | 4/2010 |
| CN | 101691279 A | * | 4/2010 |
| JP | 2-225335 | | 9/1990 |
| JP | 2010006664 A | * | 1/2010 |

\* cited by examiner

RARE EARTH IONS DOPED ALKALI METAL SILICATE LUMINESCENT GLASS AND THE PREPARATION METHOD THEREOF

TECHNICAL FIELD

The present invention relates to a luminescent material and the preparation method thereof, and more particularly, to a two rare earth ions doped alkaline earth metal silicate luminescent glass and the preparation method thereof.

BACKGROUND

Currently, there are many methods for preparation of luminescent glass, wherein one method is to introduce rare earth ion into the pores of the nano-porous glass, then the pores of the nano-porous glass are shrinked by high-temperature solid phase sintering to obtain a compact transparent rare earth ion doped high silicate luminescent glass. The luminescent glass prepared by this method has many advantages, such as: excellent chemical stability, high mechanical strength, good thermal shock resistance, and high-energy ion irradiation resistance, high UV and visible light transmittance and good machinability and the like. However, the luminous intensity of this material is not high, thus the application thereof in the field of lighting and display is greatly limited, and a lot of researches about how to enhance the luminous intensity of the rare earth ion doped high silicate glass are actively carried out at home and abroad.

In 2005 Japan's National Institute of Advanced Industrial Science and Technology reported the preparation of terbium-doped green luminescent high silicate glass by using nano-porous glass. The terbium ion was introduced into the nano-porous glass by soaking, then the nano-porous glass was sintered at 1100° C. in the air or in reductive atmosphere to give a colorless transparent quartz-liked green luminescent glass. In some research methods both alkali metal ion and terbium ion are introduced simultaneously to the pores of the nano-porous glass, after high temperature sintering and heat treatment, terbium-doped alkali metal silicate nanocrystallite will grow in the pores of the nano-porous glass, and the green luminescence of the glass is enhanced. However, the continuous enhancement of the luminescence properties of the luminescent glass is still a potential demand in the practical application. Therefore, the development of a luminescent material which may enhance the luminescence properties of the luminescent glass continuously has become an inevitable trend for the researchers.

SUMMARY

A technical problem solved by the present invention is to provide a rare earth ions doped alkaline earth metal silicate luminescent glass with excellent stability and continuously enhanced luminescence properties and the preparation method thereof.

The above-mentioned technical problems can be solved through the following technical solutions: a preparation method of rare earth ions doped alkaline earth metal silicate luminescent glass is provided, which contains:

step 1: mixing the source compounds of cerium, terbium and alkaline earth metal and dissolving them in a solvent to obtain a mixed solution;

step 2: submerging a nano-porous glass into the mixed solution obtained in step 1 for soaking;

step 3: sintering the soaked nano-porous glass obtained in step 2 in reductive atmosphere, then cooling to room temperature to obtain a cerium and terbium co-doped alkaline earth metal silicate luminescent glass.

In the method according to the present invention, in step 1, the source compound of terbium is one or more selected from the group consisting of oxide, nitrate, chloride, and acetate of terbium; the source compound of cerium is one or more selected from the group consisting of oxide, nitrate, chloride, sulfate and acetate of cerium; the source compound of alkaline earth metal is one or more selected from the group consisting of nitrate, chloride, carbonate, and acetate of alkaline earth metal, the solvent is one or more selected from the group consisting of water, nitric acid, hydrochloric acid, and acetic acid. The alkaline earth metal ion is one or more selected from the group consisting of calcium ion, strontium ion and barium ion. In the mixed solution the concentration of the terbium ion is from 0.001 to 0.1 mol/L, the concentration of the cerium ion is from 0.001 to 0.1 mol/L, the concentration of the alkali alkaline earth metal ion is from 0.1 to 1 mol/L.

In the method according to the present invention, in step 2, the nano-porous glass comprises the following components: 94.0~98.0 wt % of $SiO_2$; 1.0~3.0 wt % of $B_2O_3$; 1.0~3.0 wt % of $Al_2O_3$. The pore size of the nano-porous glass is from 4 to 30 nm, and the pore volume accounts for 25 to 40% of the total volume of the glass. And the soaking time is from 0.5 to 50 hours.

In the method according to the present invention, in step 3, the soaked nano-porous glass in step 2 is dried at room temperature, and then heated gradually, in the processes of rising from room temperature to 400° C. and from 900° C. to the sintering temperature the rise rate of temperature is no higher than 15° C./min, and the nano-porous glass is sintered at the sintering temperature of 1100-1300° C. for 1-20 hours, the sintering temperature is preferably 1150-1250° C.

Furthermore, a rare earth ions doped alkaline earth metal silicate luminescent glass made by the above preparation method is provided.

Compared to the prior art, in the method according to the present invention the terbium ion ($Tb^{3+}$), cerium ion ($Ce^{3+}$) and alkaline earth metal ion are introduced into the nano-porous glass by soaking, the pores of the glass are shrinked by high-temperature solid phase sintering in reductive atmosphere to give a compact nonporous transparent high silicate glass, and in the process of high-temperature heat treatment, the terbium ion, cerium ion and alkaline earth metal ion combined with $SiO_2$ matrix to give a Ce, Tb co-doped alkaline earth metal silicate luminescent nano-crystallite glass, in the alkaline earth metal silicate luminescent nano-crystallite glass, as the incorporation of Ce ion, compared with the single Tb doped glass, the luminescence performance thereof is enhanced, under UV excitation, the Ce ion transfers the absorbed energy to Tb ion, thereby the performance of green light emission of the Tb ion is significantly enhanced, and the glass has a higher luminous intensity. Additionally, high silicate glass matrix has good transmittance property for the UV light, which facilitates the absorption of the excitation wavelength light by the photoions, thereby improving the luminous efficiency. The $SiO_2$ content in the selected nano-porous glass matrix is no less than 94%, and the composition of the nano-porous glass is similar to that of quartz glass, and the nano-porous glass has an excellent physical and chemical properties similar to the quartz glass, such as good chemical stability, high mechanical strength, low thermal expansion coefficient, heat shock resistance and the like.

The present invention also provides a preparation method of Ce, Tb co-doped alkaline earth metal silicate luminescent nano-crystallite glass, and in the preparation method, Ce ion is co-incorporated into the Tb ion doped high silicate glass to obtain a green luminescent glass with superior light emission performance wherein the light emission of Tb ion is sensitized by Ce ion, and the green light emission of Tb is enhanced. Furthermore, the preparation method of the present invention is convenient to operate, easy to implement, and the process is simple, easy to operate, the calcination temperature is low, and has low cost.

BRIEF DESCRIPTION OF THE DRAWINGS

The present invention will be described in detail with reference to the drawings and the examples, wherein.

DETAILED DESCRIPTION OF THE PREFERRED EMBODIMENTS

Objects, advantages and embodiments of the present invention will be explained below in detail with reference to the accompanying drawings and embodiments. However, it should be appreciated that the following description of the embodiment is merely exemplary in nature and is not intended to limit this invention.

Figure 1:
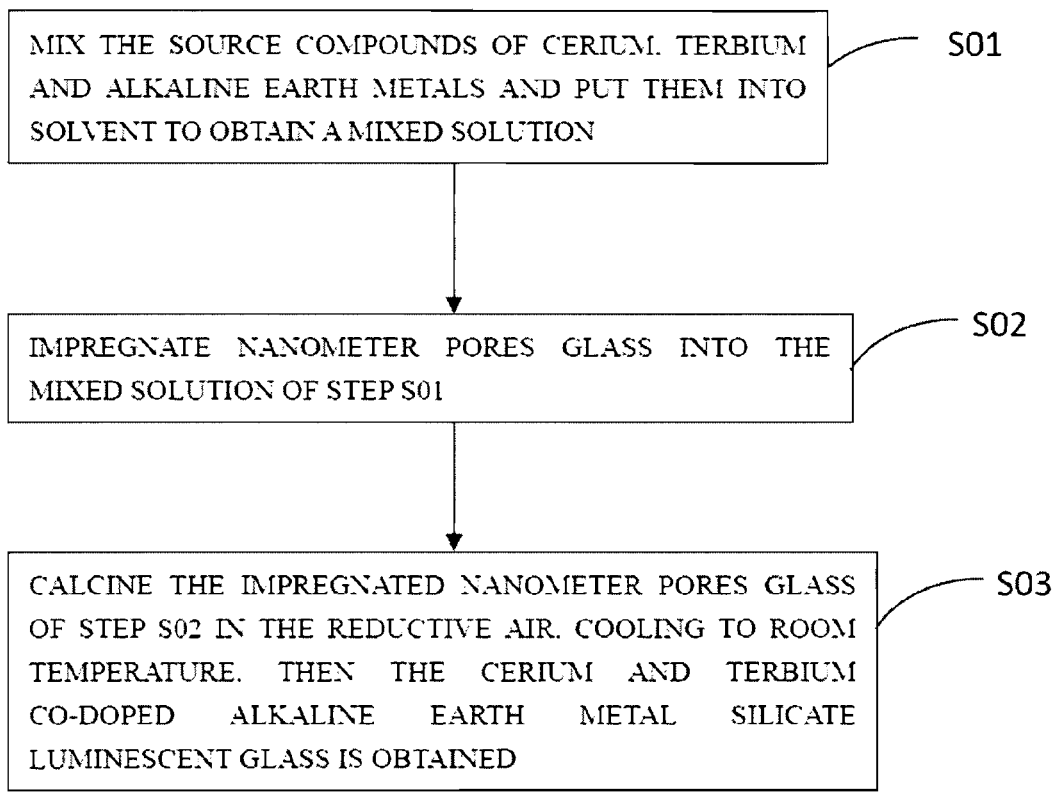
FIG. 1 is a flow chat of the preparation method of the rare earth ions doped alkaline earth metal silicate luminescent glass of the present invention.

Referring to FIG. 1, it shows the flow chat of the preparation method of the rare earth ions doped alkaline earth metal silicate luminescent glass of the present invention, the preparation method comprises the following steps:

step S01: mixing the source compounds of cerium, terbium and alkaline earth metal and dissolving them in a solvent to obtain a mixed solution;

step S02: submerging a nano-porous glass into the mixed solution obtained in step 1 for soaking;

step S03: sintering the soaked nano-porous glass obtained in step 2 in reductive atmosphere, then cooling to room temperature to obtain a cerium and terbium co-doped alkaline earth metal silicate luminescent glass.

In the method according to the present invention, in step S01, the source compound of terbium is one or more selected from the group consisting of oxide, nitrate, chloride, and acetate of terbium; the source compound of cerium is one or more selected from the group consisting of oxide, nitrate, chloride, sulfate and acetate of cerium; the source compound of alkaline earth metal is one or more selected from the group consisting of nitrate, chloride, carbonate, and acetate of alkaline earth metal, the solvent is one or more selected from the group consisting of water, nitric acid, hydrochloric acid, and acetic acid. The alkaline earth metal ion is one or more selected from the group consisting of calcium ion, strontium ion and barium ion. In the mixed solution the concentration of the terbium ion is from 0.001 to 0.1 mol/L, the concentration of the cerium ion is from 0.001 to 0.1 mol/L, the concentration of the alkaline earth metal ion is from 0.1 to 1 mol/L.

In the method according to the present invention, in step S02, the nano-porous glass comprises the components in following weight percentages: $SiO_2$ in 94.0 to 98.0%; $B_2O_3$ in 1.0 to 3.0%; $Al_2O_3$ in 1.0 to 3.0%. The pore size of the nano-porous glass is from 4 to 30 nm, and the pore volume accounts for 25 to 40% of the total volume of the glass. And the soaking time is from 0.5 to 50 hours.

In the method according to the present invention, in step S03, the soaked nano-porous glass in step 2 is dried at room temperature, and then heated gradually, in the processes of rising from room temperature to 400° C. and from 900° C. to the sintering temperature the rise rate of temperature is no higher than 15° C./min, and the nano-porous glass is sintered at the sintering temperature of 1100-1300° C. for 1-20 hours, preferably the sintering temperature is in the range of 1150-1250° C.

Furthermore, a rare earth ions doped alkaline earth metal silicate luminescent glass made by the above preparation method is provided.

In the method of the present invention the terbium ion ($Tb^{3+}$), cerium ion ($Ce^{3+}$) and alkaline earth metal ion are introduced into the nano-porous glass by soaking, the pores of the glass are shrunk by high-temperature solid phase sintering in reductive atmosphere to give a compact nonporous transparent high silicate glass, and in the process of high-temperature heat treatment, the terbium ion, cerium ion and alkaline earth metal ion combined with $SiO_2$ matrix to give a Ce, Tb co-doped alkaline earth metal silicate luminescent nano-crystallite glass, in the Ce, Tb co-doped alkaline earth metal silicate luminescent nano-crystallite glass prepared in the present invention, as the incorporation of Ce ion, under UV excitation, the Ce ion transfers the absorbed energy to Tb ion, thereby the performance of green light emission of the Tb ion is significantly enhanced, and the glass has a higher luminous intensity compared to the single Tb doped glass.

The nanoporous glass is selected as a matrix material in the present invention, wherein the luminescent particles in the pores the nano-porous glass can be well dispersed, thus the concentration quenching effect caused by the clusters is avoided, and the pore rate of up to 25-40% ensures sufficient number of nano-crystallite particles in this material, which endows the luminescent glass good light-emitting property. Additionally, high silicate glass matrix has good transmittance property for the UV light, which facilitates the absorption of the excitation wavelength light by the photoions, thereby the luminous efficiency is improved. The $SiO_2$ content in the selected nano-porous glass matrix is no less than 94%, and the composition of the glass is similar to that of quartz glass, and the glass has an excellent physical and chemical property similar to the quartz glass, such as good chemical stability, high mechanical strength, low thermal expansion coefficient, heat shock resistance and the like.

The present invention also provides a preparation method of Ce, Tb co-doped alkaline earth metal silicate luminescent nano-crystallite glass, and in the preparation method, Ce ion is co-incorporated into the Tb ion doped high silicate glass to obtain a green luminescent glass with superior light emission performance wherein the light emission of Tb ion is sensitized by Ce ion, and the green light emission of Tb is enhanced. Because of the excellent chemical stability, thermal stability and machinability, as well as good green light emission performance, the Ce, Tb co-doped alkaline earth metal silicate luminescent nano-crystallite glass of the present invention has good application prospects in the photoelectron field of lighting, display, laser and information and the like. Furthermore, the preparation method according to the embodiments of the present invention is convenient to operate, easy to implement, and the process is simple, easy to operate, the calcination temperature is low, and has low cost.

The preparation method in different ways and other characteristics of the present invention will be illustrated with reference to specific examples.

Example 1

0.423 g of analytical grade strontium nitrate ($Sr(NO_3)_2$), 0.0434 g of analytical grade cerium nitrate hexahydrate ($Ce(NO_3)_3 \cdot 6H_2O$) and 0.0453 g of analytical grade terbium nitrate hexahydrate ($Tb(NO_3)_3 \cdot 6H_2O$) were weighed on an analytical balance and dissolved in 10 ml of distilled water to give a mixed solution of $Si^{2+}$ in 0.20 mol/L, $Ce^{3+}$ in 0.01 mol/L and $Tb^{3+}$ in 0.01 mol/L. A nano-porous glass (the nano-porous glass used in the present invention is a common commercially available material, which can be obtained directly in the market) was submerged into the mixed solution and soaked for 3 hours, then it was taken out of the mixed solution and dried in the air at room temperature until the surface was dry and it was placed in a high-temperature furnace with a mixed gas of nitrogen and hydrogen (volume ratio: $N_2$: $H_2$=95:5) inlet, and the temperature of the high temperature furnace rised to 400° C. in a rate of 15° C. 1 min, then rised to 900° C. in a rate of 15° C./min, and rised to 1200° C. in a rate of 5° C./min, and sintered at 1200° C. for 2 h. The sintered glass was cooled to room temperature with the furnace then it was taken out, following cutting and polishing, the Ce, Tb co-doped alkaline earth metal silicate luminescent nano-crystallite glass according to the present invention was prepared.

Figure 2:
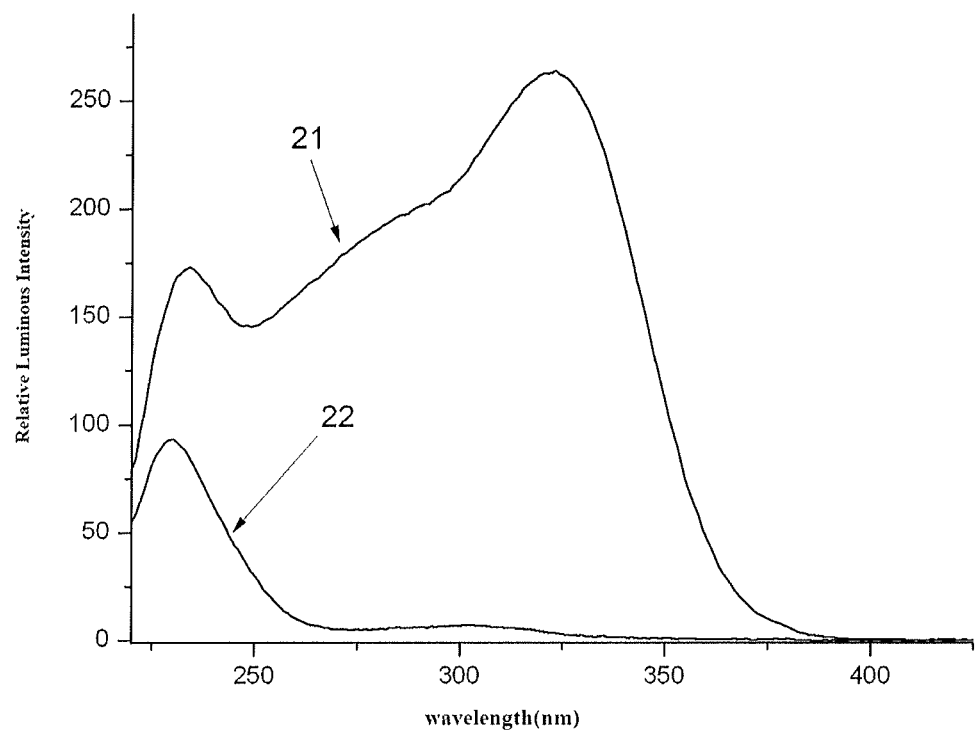
FIG. 2 shows the excitation spectrum of the Ce, Tb co-doped alkaline earth metal silicate luminescent nano-crystallite glass prepared in Example 1 of the present invention and the excitation spectrum of a single Tb doped high silicate glass as a comparison.
Figure 3:
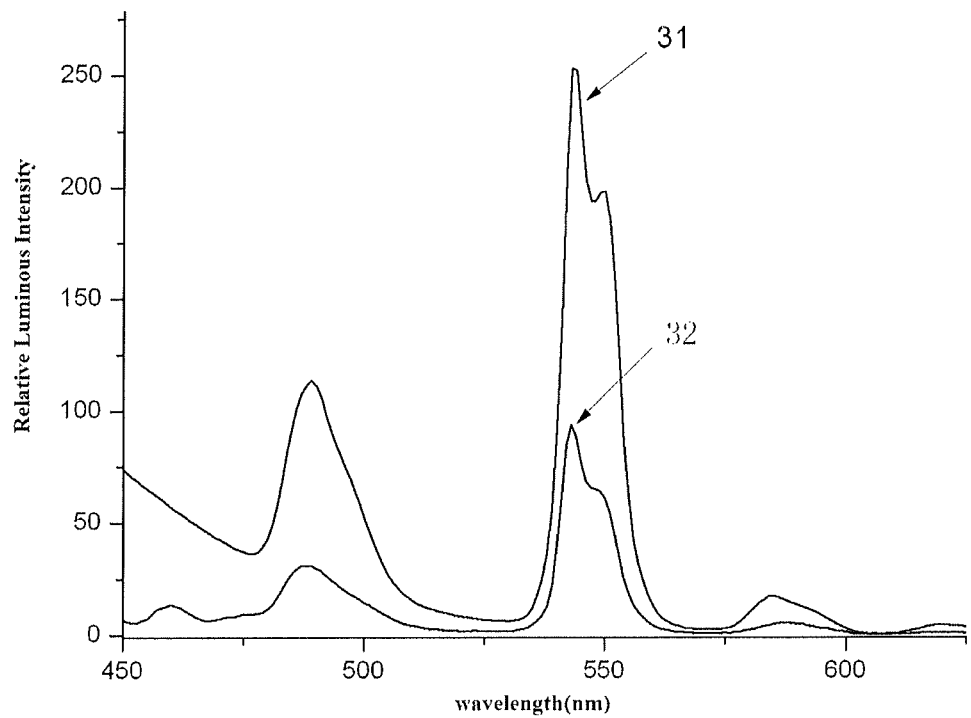
FIG. 3 shows the emission spectrum of the Ce, Tb co-doped alkaline earth metal silicate luminescent nano-crystallite glass prepared in Example 1 of the present invention and the excitation spectrum of a single Tb doped high-silicate glass as a comparison.

Referring to FIGS. 2 and 3, FIG. 2 shows the excitation spectrum of the glass prepared in this Example and the excitation spectrum of a single Tb doped high-silicate glass as a comparison, FIG. 3 shows the emission spectrum of the glass prepared in this Example and the excitation spectrum of a single Tb doped high-silicate glass as a comparison, the excitation and emission spectra of the present invention are measured on a Shimadzu RF-5301 fluorescence spectrometer at normal temperature. In FIG. 2, and curve 21 represents the excitation spectrum of the glass prepared in this Example and curve 22 represents the excitation spectrum of a single terbium-doped high-silicate glass, in FIG. 3 curve 31 represents the emission spectrum of the glass prepared in this Example, and curve 32 represents the emission spectrum of a single terbium doped high-silicate glass. It can be seen from FIGS. 2 and 3, the excitation and emission intensity of the Ce, Tb co-doped alkali alkaline earth metal silicate luminescent nano-crystallized glass prepared in this Example is more significantly compared to that of the terbium doped high silicate glass.

Example 2

1.181 g of analytical grade calcium nitrate ($Ca(NO_3)_2$), 0.217 g of analytical grade cerium nitrate hexahydrate ($Ce(NO_3)_3 \cdot 6H_2O$) and 0.0906 g of analytical grade terbium nitrate hexahydrate ($Tb(NO_3)_3 \cdot 6H_2O$) were weighed on an analytical balance and dissolved in 10 ml of distilled water to give a mixed solution of $Ca^{2+}$ in 0.50 mol/L, $Ce^{3+}$ in 0.05 mol/L and $Tb^{3+}$ in 0.02 mol/L. A nano-porous glass was submerged into the mixed solution and soaked for 10 hours, then it was taken out of the mixed solution and dried in the air at room temperature until the surface was dry and it was placed in a high-temperature furnace with a mixed gas of nitrogen and hydrogen (volume ratio: $N_2$: $H_2$=95:5) inlet, and the temperature of the high temperature furnace rised to 400° C. in a rate of 15° C./min, then rised to 900° C. in a rate of 15° C./min, and rised to 1250° C. in a rate of 5° C./min, and sintered at 1250° C. for 4 h. The sintered glass was cooled to room temperature with the furnace then it was taken out, following cutting and polishing, the Ce, Tb co-doped alkaline earth metal silicate luminescent nano-crystallite glass according to the present invention was prepared. The sintered glass was cooled to room temperature with the furnace then it was taken out, following cutting and polishing, the Ce, Tb co-doped alkali metal silicate luminescent nano-crystallite glass according to the present invention was prepared.

Example 3

0.2613 g of analytical grade barium nitrate ($Ba(NO_3)_2$), 0.0043 g of analytical grade cerium nitrate hexahydrate ($Ce(NO_3)_3 \cdot 6H_2O$) and 0.0045 g of analytical grade terbium nitrate hexahydrate ($Tb(NO_3)_3 \cdot 6H_2O$) were weighed on an analytical balance and dissolved in 10 ml of distilled water to give a mixed solution of $Ba^{2+}$ in 0.1 mol/L, $Ce^{3+}$ in 0.001 mol/L and $Tb^{3+}$ in 0.001 mol/L. A nano-porous glass was submerged into the mixed solution and soaked for 0.5 hours, then it was taken out of the mixed solution and dried in the air at room temperature until the surface was dry and it was placed in a high-temperature furnace with a mixed gas of nitrogen and hydrogen (volume ratio: $N_2$: $H_2$=95:5) inlet, and the temperature of the high temperature furnace rised to 400° C. in a rate of 15° C./min, then rised to 900° C. in a rate of 15° C./min, and rised to 1100° C. in a rate of 5° C./min, and sintered at 1100° C. for 1 h, the sintered glass was cooled to room temperature with the furnace then it was taken out, following cutting and polishing, the Ce, Tb co-doped alkaline earth metal silicate luminescent nano-crystallite glass according to the present invention was prepared.

Example 4

2.116 g of analytical grade strontium nitrate ($Sr(NO_3)_2$), 0.4342 g of analytical grade cerium nitrate hexahydrate ($Ce(NO_3)_3 \cdot 6H_2O$) and 0.4530 g of analytical grade terbium nitrate hexahydrate ($Tb(NO_3)_3 \cdot 6H_2O$) were weighed on an analytical balance and dissolved in 10 ml of distilled water to give a mixed solution of $Sr^{2+}$ in 1 mol/L, $Ce^{3+}$ in 0.1 mol/L and $Tb^{3+}$ in 0.1 mol/L. A nano-porous glass was submerged into the mixed solution and soaked for 50 hours, then it was taken out of the mixed solution and dried in the air at room temperature until the surface was dry and it was placed in a high-temperature furnace with a mixed gas of nitrogen and hydrogen (volume ratio: $N_2$: $H_2$=95:5) inlet, and the temperature of the high temperature furnace rised to 400° C. in a rate of 15° C./min, then rised to 900° C. in a rate of 15° C./min, and rised to 1300° C. in a rate of 5° C./min, and sintered at 1300° C. for 20 h. The sintered glass was cooled to room temperature with the furnace then it was taken out, following cutting and polishing, the Ce, Tb co-doped alkaline earth metal silicate luminescent nano-crystallite glass according to the present invention was prepared.

Example 5

0.3542 g of analytical grade calcium nitrate tetrahydrate ($Ca(NO_3)_2 \cdot 4H_2O$), 0.3174 g of analytical grade strontium nitrate ($Sr(NO_3)_2$), 0.1303 g of analytical grade cerium nitrate hexahydrate ($Ce(NO_3)_3 \cdot 6H_2O$) and 0.0453 g of analytical grade terbium nitrate hexahydrate ($Tb(NO_3)_3 \cdot 6H_2O$) were weighed on an analytical balance and dissolved in 10 ml of distilled water to give a mixed solution of $Ca^{2+}$ in 0.15 mol/L, $Sr^{2+}$ in 0.15 mol/L, $Ce^{3+}$ in 0.03 mol/L and $Tb^{3+}$ in 0.01 mol/L. A nano-porous glass was submerged into the mixed solution and soaked for 12 hours, then it was taken out of the mixed solution and dried in the air at room temperature until the surface was dry and it was placed in a high-temperature furnace with a mixed gas of nitrogen and hydrogen (volume ratio: $N_2$: $H_2$=95:5) inlet, and the temperature of the high temperature furnace rised to 400° C. in a rate of 12° C./min, then rised to 900° C. in a rate of 15° C./min, and rised to 1220° C. in a rate of 5° C./min, and sintered at 1220° C. for 5 h. The sintered glass was cooled to room temperature with the furnace then it was taken out, following cutting and polishing, the Ce, Tb co-doped alkaline earth metal silicate luminescent nano-crystallite glass according to the present invention was prepared.

Example 6

0.2362 g of analytical grade calcium nitrate tetrahydrate ($Ca(NO_3)_2.4H_2O$), 0.2116 g of analytical grade strontium nitrate ($Sr(NO_3)_2$), 0.2613 g of analytical grade barium nitrate, 0.0868 g of analytical grade cerium nitrate hexahydrate ($Ce(NO_3)_3.6H_2O$) and 0.0906 g of analytical grade terbium nitrate hexahydrate ($Tb(NO_3)_3.6H_2O$) were weighed on an analytical balance and dissolved in 10 ml of distilled water to give a mixed solution of $Ca^{2+}$ in 0.10 mol/L, $Sr^{2+}$ in 0.10 mol/L, $Ba^{2+}$ in 0.10 mol/L, $Ce^{3+}$ in 0.02 mol/L and $Tb^{3+}$ in 0.02 mol/L. A nano-porous glass was submerged into the mixed solution and soaked for 12 hours, then it was taken out of the mixed solution and dried in the air at room temperature until the surface was dry and it was placed in a high-temperature furnace with a mixed gas of nitrogen and hydrogen (volume ratio: $N_2$: $H_2$=95:5) inlet, and the temperature of the high temperature furnace rised to 400° C. in a rate of 12° C./min, then rised to 900° C. in a rate of 15° C./min, and rised to 1220° C. in a rate of 5° C./min, and sintered at 1220° C. for 5 h. The sintered glass was cooled to room temperature with the furnace then it was taken out, following cutting and polishing, the Ce, Tb co-doped alkaline earth metal silicate luminescent nano-crystallite glass according to the present invention was prepared.

Example 7

0.2775 g of analytical grade calcium chloride($CaCl_2$), 0.0466 g of analytical grade cerium chloride septhydrate ($CeCl_3.7H_2O$) and 0.0466 g of analytical grade terbium chloride hexahydrate ($TbCl_3.6H_2O$) were weighed on an analytical balance and dissolved in 10 ml of distilled water to give a mixed solution of $Ca^{2+}$ in 0.25 mol/L, $Ce^{3+}$ in 0.0125 mol/L and $Tb^{3+}$ in 0.0125 mol/L. A nano-porous glass was submerged into the mixed solution and soaked for 24 hours, then it was taken out of the mixed solution and dried in the air at room temperature until the surface was dry and it was placed in a high-temperature furnace with a mixed gas of nitrogen and hydrogen (volume ratio: $N_2$: $H_2$=95:5) inlet, and the temperature of the high temperature furnace rised to 400° C. in a rate of 15° C./min, then rised to 900° C. in a rate of 15° C./min, and rised to 1250° C. in a rate of 5° C./min, and sintered at 1250° C. for 6 h, the sintered glass was cooled to room temperature with the furnace then it was taken out, following cutting and polishing, the Ce, Tb co-doped alkaline earth metal silicate luminescent nano-crystallite glass according to the present invention was prepared.

Example 8

1.3672 g of analytical grade barium acetate ($Ba(CH_3COO)_2$), 0.1221 g of analytical grade cerium acetate pentahydrate ($Ce(CH_3COO)_3.5H_2O$) and 0.0708 g of analytical grade terbium acetate monohydrate ($Tb(CH_3COO)_3.H_2O$) were weighed on an analytical balance and dissolved in 10 ml of distilled water to give a mixed solution of $Ba^{2+}$ in 0.50 mol/L, $Ce^{3+}$ in 0.03 mol/L and $Tb^{3+}$ in 0.02 mol/L. A nano-porous glass was submerged into the mixed solution and soaked for 12 hours, then it was taken out of the mixed solution and dried in the air at room temperature until the surface was dry and it was placed in a high-temperature furnace with a mixed gas of nitrogen and hydrogen (volume ratio: $N_2$: $H_2$=95:5) inlet, and the temperature of the high temperature furnace rised to 400° C. in a rate of 15° C./min, then rised to 900° C. in a rate of 15° C./min, and rised to 1210° C. in a rate of 5° C./min, and sintered at 1210° C. for 3 h, the sintered glass was cooled to room temperature with the furnace then it was taken out, following cutting and polishing, the Ce, Tb co-doped alkaline earth metal silicate luminescent nano-crystallite glass according to the present invention was prepared.

Example 9

0.1845 g of analytical grade strontium carbonate($SrCO_3$), 0.2467 g of analytical grade barium carbonate ($BaCO_3$), 0.0344 g of analytical grade cerium oxide ($CeO_2$) and 0.0366 g of analytical grade terbium oxide ($Tb_2O_3$) were weighed on an analytical balance and dissolved in 10 ml of distilled water to give a mixed solution of $Sr^{2+}$ in 0.125 mol/L, $Ba^{2+}$ in 0.125 mol/L, $Ce^{3+}$ in 0.02 mol/L and $Tb^{3+}$ in 0.02 mol/L. A nano-porous glass was submerged into the mixed solution and soaked for 6 hours, then it was taken out of the mixed solution and dried in the air at room temperature until the surface was dry and it was placed in a high-temperature furnace with a mixed gas of nitrogen and hydrogen (volume ratio: $N_2$: $H_2$=95:5) inlet, and the temperature of the high temperature furnace rised to 400° C. in a rate of 15° C./min, then rised to 900° C. in a rate of 15° C./min, and rised to 1180° C. in a rate of 5° C./min, and sintered at 1180° C. for 3 h, the sintered glass was cooled to room temperature with the furnace then it was taken out, following cutting and polishing, the Ce, Tb co-doped alkaline earth metal silicate luminescent nano-crystallite glass according to the present invention was prepared.

The embodiments above are merely the preferable embodiments of the present invention and not intended to limit the present invention. And all changes, equivalent substitution and improvements which come within the meaning and range of equivalency of the present invention are intended to be embraced therein.

What is claimed is:
1. A preparation method of rare earth ion doped alkaline earth metal silicate luminescent glass, comprising:
step one: mixing source compounds of cerium, terbium and an alkaline earth metal and dissolving them in a solvent to obtain a mixed solution;
step two: submerging a nano-porous glass into the mixed solution obtained in step one for soaking, wherein a pore size of the nano-porous glass is in a range of 4 nm to 30 nm, and a nanopore volume accounts for 25% to 40% of the total volume of the nano-porous glass;
step three: sintering the soaked nano-porous glass obtained in step two in reductive atmosphere, then cooling to room temperature to obtain a cerium and terbium co-doped alkaline earth metal silicate luminescent glass, wherein in step three, the soaked nano-porous glass obtained in step two is dried at room temperature, and heated gradually from room temperature to 400° C. at a rate of from 12° C./min to 15° C./min, then heated from 400° C. to 900° C. at a rate of 15° C./min and heated from 900° C. to a sintering temperature of 1100-1300° C. at a rate of from 5° C./min to 15° C./min.

2. The preparation method of claim 1, wherein in step one, the source compound of terbium is one or more selected from the group consisting of oxide, nitrate, chloride and acetate of terbium; the source compound of cerium is one or more selected from the group consisting of oxide, nitrate, chloride, sulfate and acetate of cerium; the source compound of the alkaline earth metal is one or more selected from the group consisting of nitrate, chloride, carbonate and acetate of the alkaline earth metal, the solvent is one or more selected from the group consisting of water, nitric acid, hydrochloric acid and acetic acid.

3. The preparation method of claim 2, wherein the alkaline earth metal is one or more selected from the group consisting of calcium ion, strontium ion and barium ion.

4. The preparation method of claim 1, wherein the mixed solution obtained in step one contains 0.001 mol/L to 0.1 mol/L of terbium ion, 0.001 mol/L to 0.1 mol/L of cerium ion, and 0.1 mol/L to 1 mol/L of the alkaline earth metal ion.

5. The preparation method of claim 4, wherein the nano-porous glass in step two comprises the following components: 94.0~98.0 wt % of $SiO_2$; 1.0~3.0 wt % of $B_2O_3$; 1.0~3.0 wt % of $Al_2O_3$.

6. The preparation method of claim 1, wherein the soaking time in step two is in a range of 0.5 to 50 hours.

7. The preparation method of claim 1, wherein in step three, the nano-porous glass is sintered at the sintering temperature for 1-20 hours.

8. The preparation method of claim 7, wherein the sintering temperature is in a range of 1150° C. to 1250° C.

* * * * *